United States Patent
Prest et al.

(10) Patent No.: US 11,878,750 B2
(45) Date of Patent: Jan. 23, 2024

(54) WEAR INSERTS CAST IN A WEAR SURFACE OF A DRIVE COMPONENT

(71) Applicant: Caterpillar Inc., Peoria, IL (US)

(72) Inventors: Paul Prest, Peoria, IL (US); Benjamin Jones, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 874 days.

(21) Appl. No.: 16/745,750

(22) Filed: Jan. 17, 2020

(65) Prior Publication Data

US 2021/0221452 A1 Jul. 22, 2021

(51) Int. Cl.
*B62D 55/14* (2006.01)
*B62D 55/02* (2006.01)
*B62D 55/20* (2006.01)
*B62D 55/12* (2006.01)

(52) U.S. Cl.
CPC .......... *B62D 55/14* (2013.01); *B62D 55/12* (2013.01); *B62D 55/202* (2013.01)

(58) Field of Classification Search
CPC ....... B62D 55/18; B62D 55/12; B62D 55/202
USPC .......................................................... 305/194
See application file for complete search history.

(56) References Cited

U.S. PATENT DOCUMENTS

| | | | | |
|---|---|---|---|---|
| 1,258,607 A | * | 3/1918 | Holt | B62D 55/12 305/199 |
| 1,298,597 A | * | 3/1919 | Strait | B62D 55/12 305/117 |
| 1,318,008 A | * | 10/1919 | Johnson | B62D 55/12 305/195 |
| 1,870,801 A | * | 8/1932 | Engstrom | F16H 55/30 74/505 |
| 2,667,767 A | * | 2/1954 | Burrell | B60B 17/0044 295/11 |
| 3,007,745 A | * | 11/1961 | Even | B62D 55/14 474/191 |
| 3,499,340 A | * | 3/1970 | Katsuya | B66B 23/02 198/834 |
| 3,504,562 A | * | 4/1970 | Edward | B62D 55/0963 74/447 |
| 3,606,497 A | * | 9/1971 | Gilles | B62D 55/145 474/94 |
| 3,972,570 A | | 8/1976 | Massieon | |
| RE30,039 E | * | 6/1979 | Clemens | B60B 3/02 74/448 |
| 4,472,164 A | * | 9/1984 | Pusch | F16H 55/30 74/DIG. 10 |
| 4,607,892 A | * | 8/1986 | Payne | B62D 55/145 305/137 |

(Continued)

FOREIGN PATENT DOCUMENTS

| | | |
|---|---|---|
| CN | 107964853 | 4/2018 |
| DE | 2335588 | 3/1975 |

(Continued)

*Primary Examiner* — Kevin Hurley
*Assistant Examiner* — Michael R Stabley (57) ABSTRACT

A drive component is disclosed. The drive component may include a base of a first material having a first hardness and a plurality of wear inserts of a second material having a second hardness greater than the first hardness. The plurality of wear inserts may extend from an interior of the base to an exterior surface of the base. The base and the plurality of wear inserts may be a composite casting.

14 Claims, 6 Drawing Sheets

(56) References Cited

U.S. PATENT DOCUMENTS

| | | | | |
|---|---|---|---|---|
| 4,818,041 | A * | 4/1989 | Oertley | B62D 55/145 |
| | | | | 295/20 |
| 5,141,299 | A * | 8/1992 | Korpi | B62D 55/145 |
| | | | | 305/137 |
| 5,190,363 | A * | 3/1993 | Brittain | B62D 55/088 |
| | | | | 305/137 |
| 5,210,948 | A * | 5/1993 | Seksaria | B60B 5/02 |
| | | | | 29/894.351 |
| 5,413,407 | A * | 5/1995 | Warner | B60C 7/22 |
| | | | | 305/197 |
| 5,462,345 | A * | 10/1995 | Purcell | B62D 55/0847 |
| | | | | 305/139 |
| 5,573,057 | A * | 11/1996 | McDonald | F16H 53/02 |
| | | | | 164/58.1 |
| 5,636,911 | A * | 6/1997 | Korpi | F16H 7/06 |
| | | | | 305/193 |
| 5,819,910 | A * | 10/1998 | Langer | B66B 23/024 |
| | | | | 198/330 |
| 5,829,850 | A * | 11/1998 | Ketting | F16G 13/06 |
| | | | | 305/203 |
| 6,025,062 | A * | 2/2000 | Krenkel | B29D 99/0003 |
| | | | | 74/462 |
| 6,071,204 | A * | 6/2000 | Jefferies | F16H 55/30 |
| | | | | 474/161 |
| 6,843,540 | B2 * | 1/2005 | Kanzler | B62D 55/12 |
| | | | | 305/195 |
| 7,032,983 | B2 * | 4/2006 | Wu | F16H 55/30 |
| | | | | 305/195 |
| 7,097,580 | B2 * | 8/2006 | Sakamoto | F16H 55/30 |
| | | | | 474/152 |
| 7,338,138 | B2 * | 3/2008 | Sho | B62D 55/20 |
| | | | | 305/201 |
| 7,641,293 | B2 | 1/2010 | Doyle | |
| 8,287,238 | B2 * | 10/2012 | DiMascio | F16H 55/12 |
| | | | | 415/129 |
| 8,360,535 | B2 * | 1/2013 | Johannsen | B62D 55/32 |
| | | | | 305/137 |
| 8,398,182 | B2 * | 3/2013 | Simula | B62D 55/145 |
| | | | | 305/193 |
| 8,419,139 | B2 * | 4/2013 | Kaufold | F16H 55/06 |
| | | | | 305/137 |
| 9,457,851 | B2 | 10/2016 | Delisle | |
| 9,651,132 | B2 | 5/2017 | Mummigatti et al. | |
| 9,663,163 | B2 * | 5/2017 | Hobe | B62D 55/15 |
| 9,902,443 | B2 * | 2/2018 | Kita | B62D 55/145 |
| 9,988,110 | B2 * | 6/2018 | Scheuerman | B62D 55/202 |
| 10,086,462 | B2 * | 10/2018 | Grigorenko | B23K 9/12 |
| 10,267,718 | B2 * | 4/2019 | Johnson | G01N 3/56 |
| 10,309,514 | B2 * | 6/2019 | Crump | F16H 55/30 |
| 10,385,958 | B2 * | 8/2019 | Medaglia | F16H 55/12 |
| 2003/0160506 | A1 * | 8/2003 | Averkamp | B62D 55/15 |
| | | | | 305/136 |
| 2005/0090347 | A1 | 4/2005 | Revankar et al. | |
| 2009/0085399 | A1 * | 4/2009 | Moyna | B62D 55/12 |
| | | | | 305/194 |
| 2010/0102623 | A1 * | 4/2010 | Mulligan | B62D 55/145 |
| | | | | 305/137 |
| 2011/0138951 | A1 * | 6/2011 | Mashue | F16H 55/17 |
| | | | | 74/640 |
| 2012/0156520 | A1 * | 6/2012 | Meyer | C21D 1/18 |
| | | | | 219/76.14 |
| 2015/0353152 | A1 * | 12/2015 | Hakes | B62D 55/32 |
| | | | | 305/15 |
| 2017/0216949 | A1 * | 8/2017 | Ohishi | B62D 55/12 |
| 2021/0179209 | A1 * | 6/2021 | Gross | B62D 55/202 |

FOREIGN PATENT DOCUMENTS

| | | | |
|---|---|---|---|
| EP | 0035913 | 9/1981 | |
| KR | 100785736 B1 * | 12/2007 | |
| KR | 20080024977 A * | 3/2008 | |
| KR | 20120052877 A * | 5/2012 | |
| SU | 1180547 A1 | 9/1985 | |
| WO | WO-2008093160 A1 * | 8/2008 | ......... B62D 55/0887 |
| ZA | 7802681 B | 7/1979 | |

* cited by examiner

WEAR INSERTS CAST IN A WEAR SURFACE OF A DRIVE COMPONENT

TECHNICAL FIELD

The present disclosure relates generally to a drive component, such as a drive sprocket, an idler wheel, or a track pad, and, for example, to wear inserts cast in a wear surface of the drive component.

BACKGROUND

A machine may be moveable by use of a continuous track. A continuous track may include a chain of multiple track pads interlocked by a pin and pin bore system. The chain of multiple track pads may be engaged with one or more drive sprockets and/or one or more idler wheels around which the chain rotates. Contact between the track pad and the drive sprocket and/or the idler wheel may cause significant wear to surfaces of the track pad, the drive sprocket, and/or the idler wheel. As a result, a useful life of such drive components may be reduced, and frequent replacement may be necessary. In some cases, the drive components may include wear inserts of a relatively harder material to prolong a useful life the drive components.

One attempt to provide a wear resistant liner is disclosed in South Africa Patent No. 7802681 that issued to Ullerstam on Jul. 25, 1979 ("the '681 patent"). In particular, the '681 patent discloses a wear resistant liner for a rotary mill which comprises a grid defining a plurality of interstices, and a plurality of exposed, tight fitting inserts of a wear resistant material located in the interstices. The '681 patent also discloses that the inserts may be of a material which is relatively hard in comparison with the material of the grid, for example cast iron and in particular white iron, and that the grid may be cast using manganese steel. Moreover, the '681 patent indicates that the liner may be secured via the grid to a supporting base by means of bolts passing through the grid or by wedgelike fastening members.

While the liner of the '681 patent may provide wear resistance for a rotary mill, the '681 patent does not indicate that the liner may be used with a drive component, such as a drive sprocket, an idler wheel, or a track pad. In addition, the '681 patent does not indicate that the liner and the rotary mill may be a composite casting. Rather, the '681 patent describes the liner as being attached to the rotary mill by bolts or wedgelike fastening members, which adds additional manufacturing steps and introduces additional components that may wear or fail.

The drive component of the present disclosure solves one or more of the problems set forth above and/or other problems in the art.

SUMMARY

According to some implementations, a drive sprocket may include a drive sprocket base of a first material having a first hardness; and a plurality of wear inserts of a second material having a second hardness greater than the first hardness, the plurality of wear inserts extending from an interior of the drive sprocket base to an exterior surface of the drive sprocket base, and the drive sprocket base and the plurality of wear inserts being a composite casting.

According to some implementations, an idler wheel may include an idler wheel base of a first material having a first hardness; and a plurality of wear inserts of a second material having a second hardness greater than the first hardness, the plurality of wear inserts extending from an interior of the idler wheel base to an exterior surface of the idler wheel base, and the idler wheel base and the plurality of wear inserts being a composite casting.

According to some implementations, a track pad may include a track pad base of a first material having a first hardness; and a plurality of wear inserts of a second material having a second hardness greater than the first hardness, the plurality of wear inserts extending from an interior of the track pad base to an exterior surface of the track pad base, and the track pad base and the plurality of wear inserts being a composite casting.

According to some implementations, a component may include a base of a first material having a first hardness; and a plurality of wear inserts of a second material having a second hardness greater than the first hardness, the plurality of wear inserts extending from an interior of the base to an exterior surface of the base, and the base and the plurality of wear inserts being a composite casting.

DETAILED DESCRIPTION

This disclosure relates to a drive component, such as a drive sprocket, an idler wheel, or a track pad. The drive component has universal applicability to any track-type machine.

Figure 1:
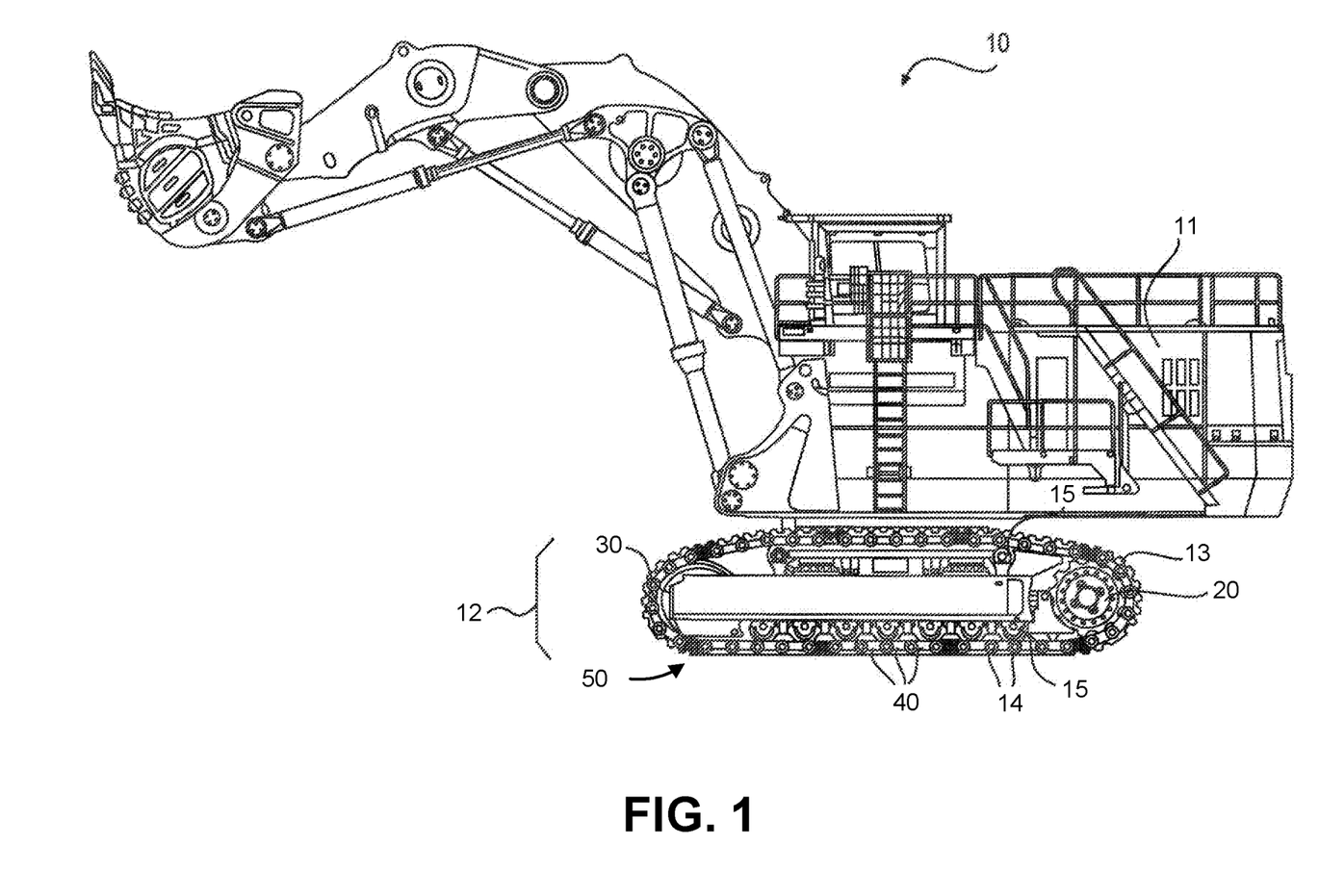
FIG. 1 is a diagram of an example machine that includes one or more drive components.

FIG. 1 is a diagram of an example machine 10 having an engine 11 configured to drive a tracked undercarriage 12. Machine 10 may be any machine that performs an operation associated with an industry such as, for example, mining, construction, farming, transportation, or any other industry. For example, machine 10 may be a material moving machine such as a front shovel, a rope shovel, a hydraulic excavator, a dozer, a loader, or another material moving machine.

Undercarriage 12 includes parallel tracks 13 located at opposing sides of machine 10 that are driven by engine 11 via corresponding drive sprockets 20 (only one track 13 and one drive sprocket 20 are shown in FIG. 1). Each track 13 includes a plurality of track pads 40 connected end-to-end via pins 14 to form a chain. The chains are wrapped around corresponding drive sprockets 20, one or more idler wheels 30, and at least one load roller 15. Drive sprockets 20 engage bushings (not shown) that encase pins 14 and thereby transmit torque from engine 11 to the chains. Idler wheel 30 and load rollers 15 guide the chain in an elliptical trajectory around drive sprocket 20. Track pads 40 function to transmit the torque from drive sprocket 20 as a driving linear force into a ground surface.

As indicated above, FIG. 1 is provided as an example. Other examples may differ from what was described in connection with FIG. 1.

Figure 2:
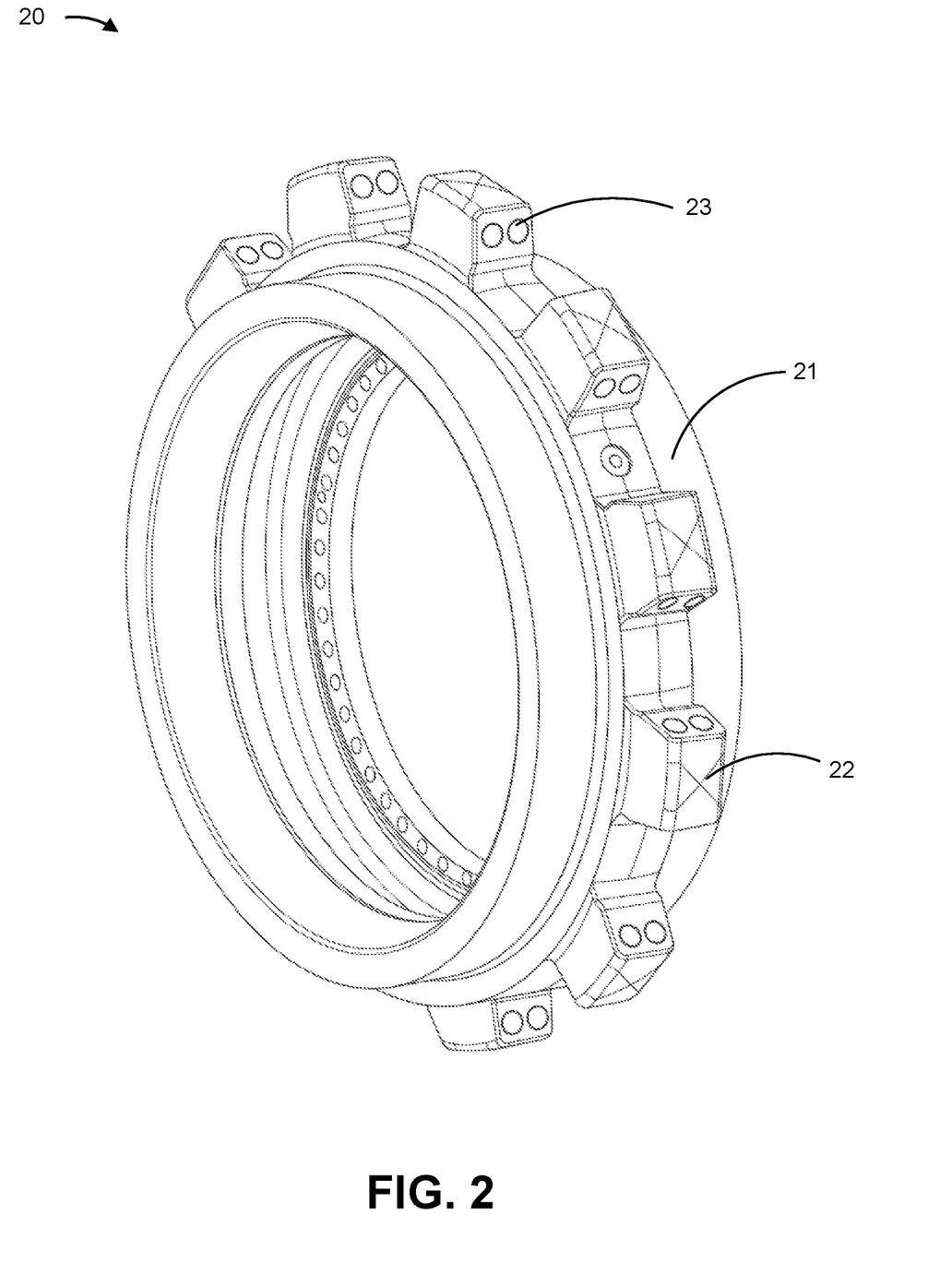
FIG. 2 is a diagram of an example drive sprocket that may be used with the machine of FIG. 1.

FIG. 2 is a diagram of an example drive sprocket 20 that may be used with machine 10. As shown in FIG. 2, drive sprocket 20 includes a drive sprocket base 21 (e.g., a substrate) having an annular portion and a plurality of teeth 22 extending radially from the annular portion. The plurality of teeth 22 are configured to engage with drive lugs of a plurality of track pads 40 (shown in FIGS. 1 and 5).

Drive sprocket 20 may include a plurality of wear inserts 23 that extend from an interior of the drive sprocket base 21 to an exterior surface of the drive sprocket base 21 (e.g., ends of the plurality of wear inserts 23 are flush with the exterior surface of the drive sprocket base 21). In other words, the plurality of wear inserts 23 may be rods or slugs embedded in the drive sprocket base 21 up to a depth of 20 millimeters (mm), 25 mm, 30 mm, or 35 mm. The plurality of wear inserts 23 may be located in a wear surface of drive sprocket base 21. For example, the plurality of wear inserts 23 may be located in a track pad-engaging surface of drive sprocket base 21. As an example, the plurality of wear inserts 23 may be located in surfaces of the plurality of teeth 22 of drive sprocket base 21.

A tooth 22 of the plurality of teeth 22 may include a forward surface and a rearward surface in a direction of rotation of drive sprocket 20, lateral surfaces that extend between the forward surface and the rearward surface, and a top surface that extends between the forward surface and the rearward surface and the lateral surfaces. As shown in FIG. 2, one or more wear inserts 23 may be located in a forward surface and/or a rearward surface of a tooth 22. In such a case, wear inserts 23 may include a first slug located in the forward surface and a second slug located in the rearward surface that are separated by an interior section of the tooth 22, such that the first slug and the second slug do not share a common bore in the tooth 22 (e.g., so that a force applied to the first slug in the forward surface does not dislodge the second slug in the rearward surface). In some implementations, one or more wear inserts 23 may be located in one or both lateral surfaces of a tooth 22 and/or the top surface of a tooth 22. Additionally, or alternatively, one or more wear inserts 23 may be located in a surface of drive sprocket base 21 that extends between adjacent teeth 22 of the plurality of teeth 22.

As shown in FIG. 2, a wear insert 23 may have a circular cross section. In such a case, one or two wear inserts 23 may be located in a surface of a tooth 22 (e.g., a forward surface, a rearward surface, a lateral surface, and/or a top surface). In some implementations, a wear insert 23 may have an elliptical cross section. In such a case, a single wear insert 23 may be located in a surface of a tooth 22 (e.g., a forward surface, a rearward surface, a lateral surface, and/or a top surface). For example, a single elliptical wear insert 23 may be located in a forward surface and/or a rearward surface of a tooth 22 such that a major axis of the ellipse is transverse to the direction of rotation of drive sprocket 20. In some implementations, a wear insert 23 may have a polygonal cross section. In addition, the plurality of wear inserts 23 may have the same cross-sectional shape or different cross-sectional shapes.

In some implementations, a wear insert 23 may have a dimension from 0.5 inches to 1.25 inches, such as from 0.75 inches to 1 inch. The dimension may be a diameter of a circular wear insert, or a major axis or a minor axis of an elliptical wear insert. An edge-to-edge distance between one wear insert and another wear insert may be at least 0.5 inches, such as from 0.5 inches to 1 inch, or 0.75 inches. For example, a shortest distance between a first wear insert 23 and a second wear insert 23 may be the edge-to-edge distance. Moreover, a center-to-center distance between one wear insert and another wear insert may be at least 1 inch, such as from 1 inch to 2 inches, or 1.5 inches. For example, a distance between a center point of a first wear insert 23 and a center point of a second wear insert 23 may be the center-to-center distance. In this way, an area of wear inserts 23 may be 50% to 75% or 70% to 75% of a total area (e.g., including the area of wear inserts 23) of a wear surface (e.g., a track-pad engaging surface, such as a forward surface or a rearward surface of a tooth 22) of drive sprocket base 21.

In some implementations, a wear insert 23 may include one or more fixation elements on a body of the wear insert 23 (e.g., a portion of the wear insert 23 between ends of the wear insert 23). A fixation element may include a groove, a notch, a taper, a fin, and/or a protrusion. For example, one or more grooves may be machined into a body of a wear insert 23. As another example, a wear insert 23 may have a screw shape or a tapered shape. The one or more fixation elements provide a mechanical connection between a wear insert 23 and drive sprocket base 21.

Drive sprocket base 21 may be composed of a first material and the plurality of wear inserts 23 may be composed of a second material. For example, the first material may be a first metal and the second material may be a second metal. In some implementations, the first metal may be steel (e.g., carbon steel) or gray iron and the second metal may be white iron (e.g., cast iron with up to 3% carbon). For example, the white iron may be an alloy of iron, 1.8% to 3.6% carbon, 0.5% to 1.9% silicon, and 1% to 2% manganese. The first material may have a first hardness and the second material may have a second hardness greater than the first hardness. For example, the first hardness may be from 45 to 55 Rockwell C (HRC) and the second hardness may be from 55 to 65 HRC, such as from 60 to 62 HRC. Accordingly, a ratio of the second hardness to the first hardness may be between 1.1:1 to 1.5:1. Additionally, or alternatively, the first material may have a first melting point and the second material may have a second melting point less than the first melting point. For example, the first material may be gray iron having a melting point of about (e.g., ±1%) 1600° C. and the second material may be white iron having a melting point of about 1500° C.

Drive sprocket base 21 and the plurality of wear inserts 23 may form a composite casting (e.g., a casting of the first material and the second material). That is, drive sprocket 20 may be a composite casting that includes drive sprocket base 21 (composed of the first material) and the plurality of wear inserts 23 (composed of the second material). The composite casting of drive sprocket base 21 and the plurality of wear inserts 23 may be formed according to a composite casting process, as described in connection with FIG. 6.

As indicated above, FIG. 2 is provided as an example. Other examples may differ from what is described in connection with FIG. 2.

Figure 3:
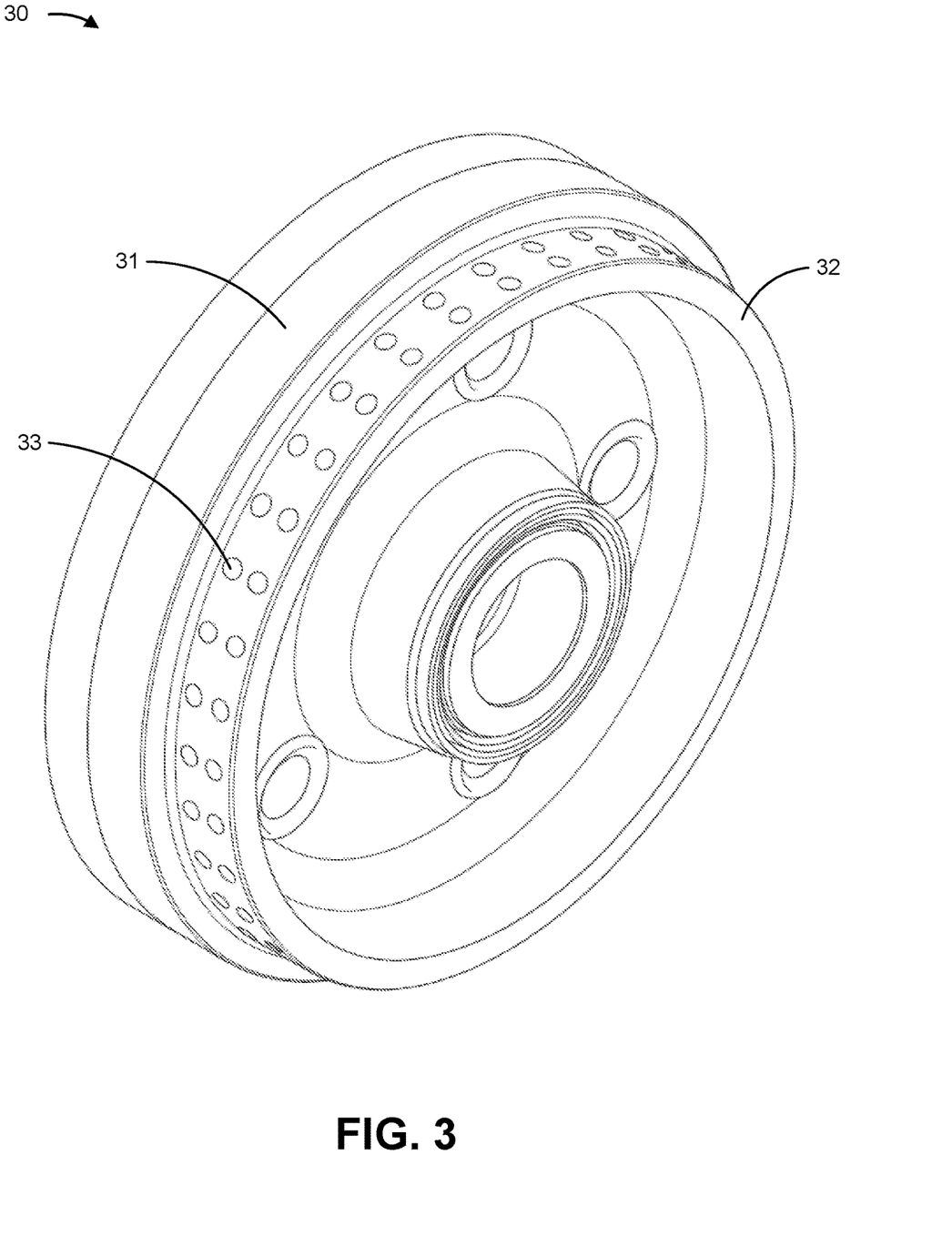
FIG. 3 is a diagram of an example idler wheel that may be used with the machine of FIG. 1.

FIG. 3 is a diagram of an example idler wheel 30 that may be used with machine 10. As shown in FIG. 3, idler wheel 30 includes an idler wheel base 31 (e.g., a substrate) having an annular portion and one or more treads 32 extending circumferentially from the annular portion. The treads 32 are configured to engage with drive lugs of a plurality of track pads 40 (shown in FIGS. 1 and 5).

Idler wheel 30 may include a plurality of wear inserts 33 that extend from an interior of idler wheel base 31 to an exterior surface of idler wheel base 31, as described above in connection with FIG. 2. The plurality of wear inserts 33 may be located in a wear surface of idler wheel base 31. For example, the plurality of wear inserts 33 may be located in a track pad-engaging surface of idler wheel base 31. As an example, the plurality of wear inserts 33 may be located in surfaces of treads 32 of idler wheel base 31.

A tread 32 may be annular and include an outward surface facing away from an axis of rotation of idler wheel 30, an inward surface facing toward the axis of rotation of idler wheel 30, and a lateral surface extending between the outward surface and the inward surface. As shown in FIG. 3, one or more wear inserts 33 may be located in an outward surface of a tread 32. In some implementations, one or more wear inserts 33 may be located in a lateral surface of a tread 32.

As shown in FIG. 3, a wear insert 33 may have a circular cross section. In such a case, one or two wear inserts 33 may be included in a row of spaced rows (e.g., equidistantly spaced rows) around an outward surface of a tread 32. In some implementations, a wear insert 33 may have an elliptical cross section. In such a case, the plurality of wear inserts 33 may be spaced around an outward surface of a tread 32 such that a major axis of the ellipse aligns with the direction of rotation of idler wheel 30. In some implementations, a wear insert 33 may have a polygonal cross section. In addition, the plurality of wear inserts 33 may have the same cross-sectional shape or different cross-sectional shapes. Wear inserts 33 also may have a dimension, a spacing (e.g., an edge-to-edge distance and/or a center-to-center distance), and/or a fixation element, as described above in connection with FIG. 2. For example, an area of wear inserts 23 may be 50% to 75% or 70% to 75% of a total area of a wear surface (e.g., a track-pad engaging surface, such as an outward surface of a tread 32) of idler wheel base 31.

Idler wheel base 31 may be composed of a first material and the plurality of wear inserts 33 may be composed of a second material, as described above in connection with FIG. 2. In addition, idler wheel base 31 and the plurality of wear inserts 33 may form a composite casting. That is, idler wheel 30 may be a composite casting that includes idler wheel base 31 (composed of the first material) and the plurality of wear inserts 33 (composed of the second material). The composite casting of idler wheel base 31 and the plurality of wear inserts 33 may be formed according to a composite casting process, as described in connection with FIG. 6.

As indicated above, FIG. 3 is provided as an example. Other examples may differ from what is described in connection with FIG. 3.

Figure 4:
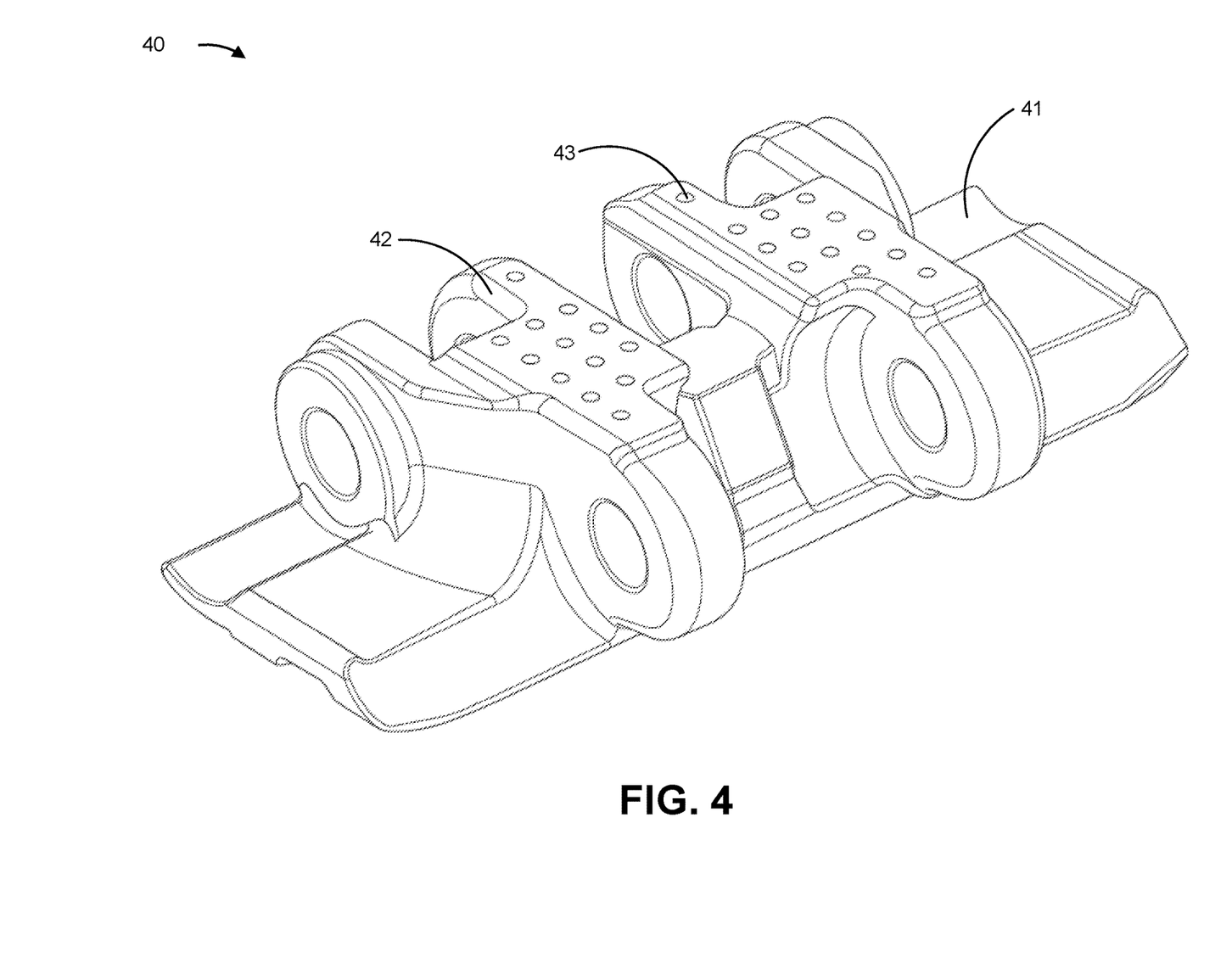
FIG. 4 is a diagram of an example track pad that may be used with the machine of FIG. 1.

FIG. 4 is a diagram of an example track pad 40 that may be used with machine 10. For example, a plurality of track pads 40 may form a continuous track of machine 10, as described above in connection with FIG. 1. As shown in FIG. 4, track pad 40 includes a track pad base 41 (e.g., a substrate) having one or more drive lugs 42. Drive lugs 42 are configured to engage with teeth of drive sprocket 20 (as shown in FIG. 2) and/or treads of idler wheel 30 (as shown in FIG. 3).

Track pad 40 may include a plurality of wear inserts 43 that extend from an interior of track pad base 41 to an exterior surface of track pad base 41, as described above in connection with FIG. 2. The plurality of wear inserts 43 may be located in a wear surface of track pad base 41. For example, the plurality of wear inserts 43 may be located in a drive sprocket-engaging surface and/or an idler wheel-engaging surface of track pad base 41. As an example, the plurality of wear inserts 43 may be located in surfaces of drive lugs 42 of track pad base 41.

As shown in FIG. 4, a wear insert 43 may have a circular cross section. In some implementations, a wear insert 43 may have an elliptical cross section or a polygonal cross section. In addition, the plurality of wear inserts 43 may have the same cross-sectional shape or different cross-sectional shapes. Wear inserts 43 also may have a dimension, a spacing (e.g., an edge-to-edge distance and/or a center-to-center distance), and/or a fixation element, as described above in connection with FIG. 2. For example, an area of wear inserts 23 may be 50% to 75% or 70% to 75% of a total area of a wear surface (e.g., a drive sprocket-engaging surface and/or an idler wheel-engaging surface, such as a surface of a drive lug 42) of track pad base 41.

Track pad base 41 may be composed of a first material and the plurality of wear inserts 43 may be composed of a second material, as described above in connection with FIG. 2. In addition, track pad base 41 and the plurality of wear inserts 43 may form a composite casting. That is, track pad 40 may be a composite casting that includes track pad base 41 (composed of the first material) and the plurality of wear inserts 43 (composed of the second material). The composite casting of track pad base 41 and the plurality of wear inserts 43 may be formed according to a composite casting process, as described in connection with FIG. 6.

As indicated above, FIG. 4 is provided as an example. Other examples may differ from what is described in connection with FIG. 4.

Figure 5:
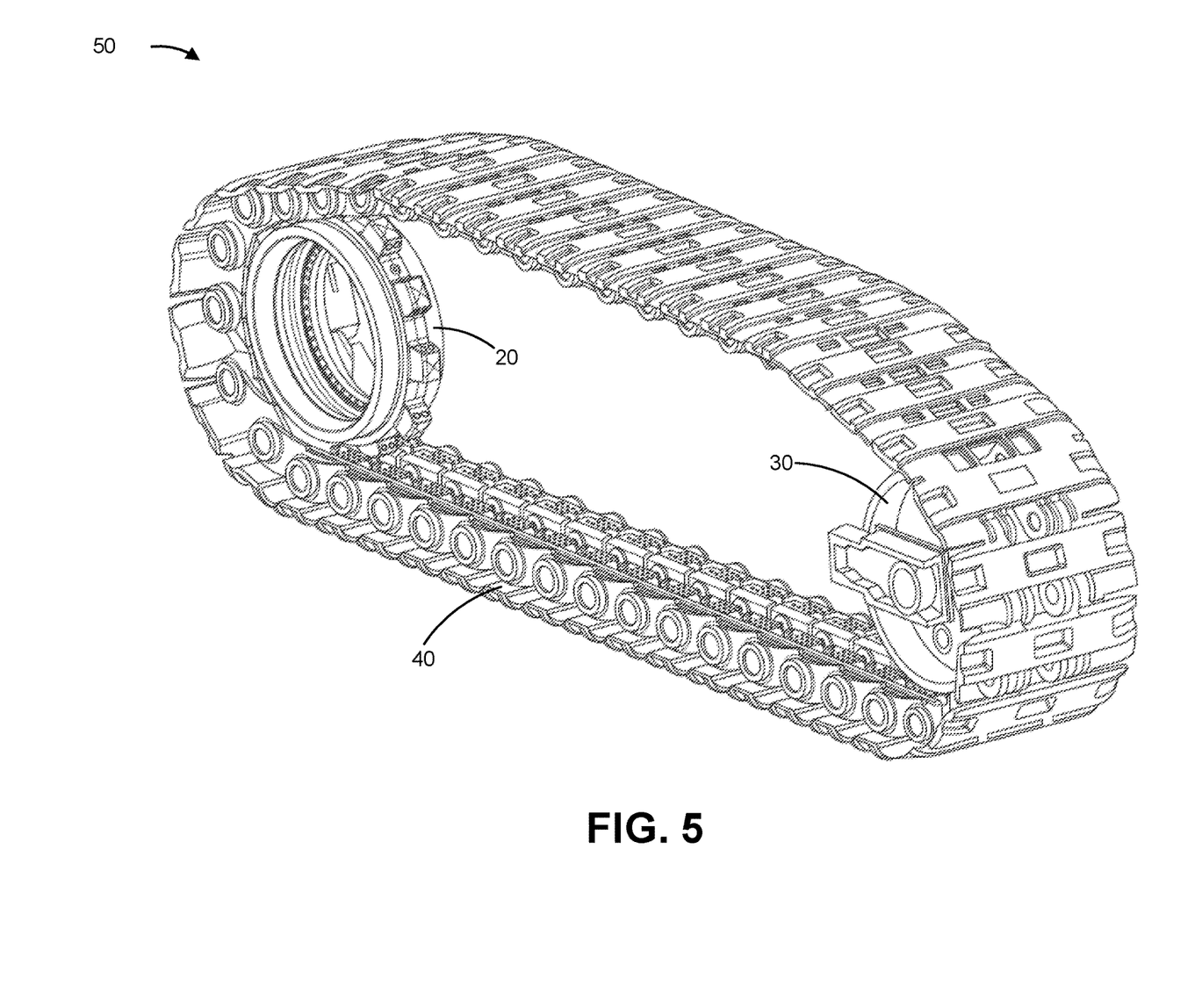
FIG. 5 is a diagram of an example track system that may be used with the machine of FIG. 1.

FIG. 5 is a diagram of an example track system 50 that may be used with machine 10. Track system 50 may include a plurality of track pads 40 that are connected to form a continuous track. The track may engage a drive sprocket 20 and an idler wheel 30. As shown in FIG. 5, drive lug surfaces of the track pads 40 may engage with tooth surfaces of the drive sprocket 20 and/or tread surfaces of the idler wheel 30. Accordingly, the drive lug surfaces, tooth surfaces, and/or tread surfaces may include wear inserts, as described above in connection with FIGS. 2-4. For example, locations of wear inserts in the drive sprocket and/or locations of wear inserts in the idler wheel may correspond to locations of wear inserts in the track pads, such that the wear inserts in the drive sprocket and/or the idler wheel contact the wear inserts of the track pads during movement of the track pad over the drive sprocket and idler wheel.

As indicated above, FIG. 5 is provided as an example. Other examples may differ from what is described in connection with FIG. 5.

Figure 6:
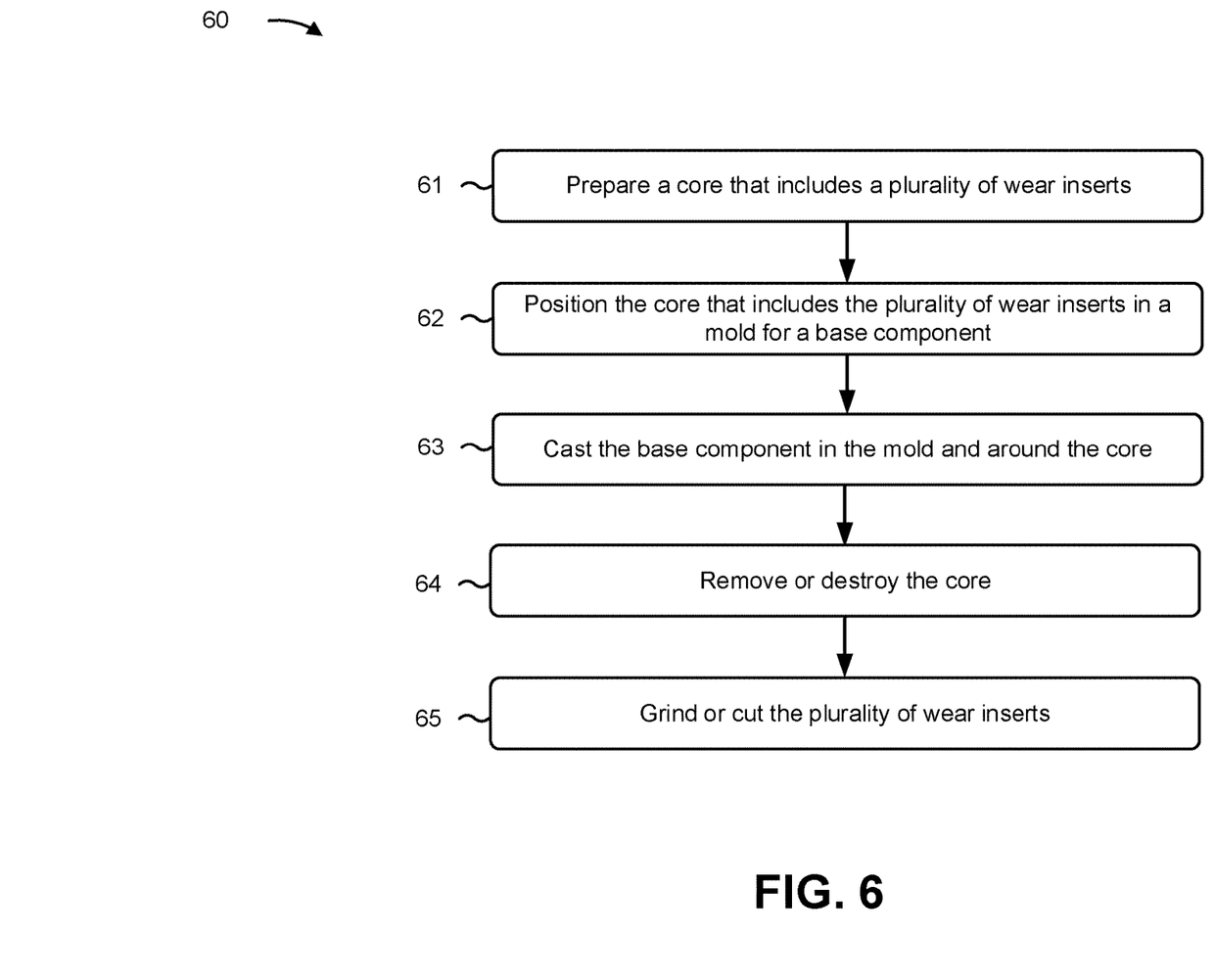
FIG. 6 is a flowchart of an example process for composite casting.

FIG. 6 is a flowchart of an example process 60 for composite casting. For example, drive sprocket 20, idler wheel 30, or track pad 40 may be a composite casting formed by process 60. One or more process blocks of FIG. 6 may be performed by a machine.

As shown in FIG. 6, process 60 may include preparing a core (e.g., a sand core) that includes a plurality of wear inserts (e.g., wear inserts 23, wear inserts 33, or wear inserts 43) (block 61). A size and shape of the core may correspond to a space that surrounds a base component (e.g., drive sprocket base 21, idler wheel base 31, or track pad base 41). The plurality of wear inserts may protrude from a surface of the core, such that the plurality of wear inserts will embed in the cast base component, as described below. Accordingly, the plurality of wear inserts may be positioned in the core in a configuration that corresponds to a configuration in which the plurality of wear inserts are to be located in the base component (e.g., wear surfaces of the base component).

As shown in FIG. 6, process 60 may include positioning the core that includes the plurality of wear inserts in a mold for the base component (block 62). For example, the mold may correspond to drive sprocket base 21, idler wheel base 31, or track pad base 41. The core may be positioned in the mold to define an exterior surface of the base component.

As shown in FIG. 6, process 60 may include casting the base component (e.g., drive sprocket base 21, idler wheel base 31, or track pad base 41) in the mold and around the core (block 63). Accordingly, the plurality of wear inserts, which protrude from the core, will embed in the cast base component (e.g., at a depth corresponding to an amount by which the plurality of wear inserts protrude from the core).

In some implementations, casting the base component may include depositing a molten first material in the mold and around the core that includes the plurality of wear inserts of a second material. During casting, the molten first material may cause melting at an interface with the plurality of wear inserts of the second material, thereby resulting in a metallurgical bond between the first material and the second material.

As shown in FIG. 6, process 60 may include removing or destroying the core (block 64). In this way, a composite casting of the base component and the plurality of wear inserts, embedded in the base component, will remain after the core is removed or destroyed. The composite casting may correspond to drive sprocket 20, idler wheel 30, or track pad 40. In some cases, portions of the plurality of wear inserts may protrude from an exterior surface of the base component after the core is removed or destroyed.

As shown in FIG. 6, process 60 may include grinding or cutting the plurality of wear inserts (block 65). For example, portions of the plurality of wear inserts that protrude from the exterior surface of the base component may be ground or cut flush with the exterior surface. In some implementations, process 60 may further include performing a hardening procedure on an exterior surface of the composite casting (e.g., an exterior surface of the base component in which the plurality of wear inserts are located).

Although FIG. 6 shows example blocks of process 60, in some implementations, process 60 may include additional blocks, fewer blocks, different blocks, or differently arranged blocks than those depicted in FIG. 6. Additionally, or alternatively, two or more of the blocks of process 60 may be performed in parallel.

INDUSTRIAL APPLICABILITY

The disclosed drive component (e.g., drive sprocket, idler wheel, and/or track pad) may be used with any machine employing a track system. The wear inserts of the drive component may reduce wear to the drive component, thereby extending a useful life of the drive component. For example, the wear inserts, of a harder material, may be located in a wear surface, of a softer material, of the drive component, such as a track pad-engaging surface, a drive sprocket-engaging surface, or an idler wheel-engaging surface. Accordingly, when a wear surface of one drive component engages with a wear surface of another drive component during operation of the machine, the wear inserts, rather than the wear surface, may receive friction, impact, and/or the like, of the engagement, thereby reducing wear to the drive components. As a result, the drive component may require less frequent replacement or maintenance and may be less susceptible to damage or malfunction.

Moreover, the drive component may be a composite casting of a base component and the wear inserts. For example, the drive component may be prepared according to a composite casting process whereby the base component and the wear inserts are cast together in a single casting. In this way, manufacture and construction of the drive component may be simplified, thereby improving manufacturing speed and reducing potential manufacturing defects. Moreover, the simplicity of the composite casting of the drive component includes fewer parts, joints, bonds, and/or the like, that are susceptible to failure, thus providing improved durability of the drive component. In addition, the composite casting introduces a mechanical connection and/or a metallurgical bond between the base component and the wear inserts without a need for a separate bonding procedure after casting of the base component. In this way, the wear inserts have improved attachment to the base component, thereby requiring less frequent replacement or maintenance.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A drive sprocket, comprising:
    a drive sprocket base of a first material having a first hardness; and
    a plurality of wear inserts of a second material having a second hardness greater than the first hardness,
        the plurality of wear inserts extending from an interior of the drive sprocket base to an exterior surface of the drive sprocket base, and
        the drive sprocket base and the plurality of wear inserts being a composite casting formed in a mold and in a single casting.

2. The drive sprocket of claim 1, wherein the drive sprocket base includes a plurality of teeth, and
    wherein one or more of the plurality of wear inserts are located in one or more of the plurality of teeth.

3. The drive sprocket of claim 1, wherein one or two wear inserts, of the plurality of wear inserts, are located in a surface of a tooth of the drive sprocket, and
    wherein an area of the one or two wear inserts is 50% to 70% of a total area of the surface of the tooth.

4. The drive sprocket of claim 1,
    wherein the drive sprocket base includes a first tooth and a second tooth, and
    wherein a wear insert is located in a surface of the drive sprocket base between the first tooth and the second tooth.

5. The drive sprocket of claim 1, wherein the drive sprocket base and the plurality of wear inserts are metallurgically bonded.

6. The drive sprocket of claim 1, wherein the first material includes steel and the second material includes white iron.

7. The drive sprocket of claim 1, wherein a ratio of the second hardness to the first hardness is between 1.1:1 and 1.5:1.

8. An idler wheel, comprising:
- an idler wheel base of a first material having a first hardness; and
- a plurality of wear inserts of a second material having a second hardness greater than the first hardness,
  - the plurality of wear inserts extending from an interior of the idler wheel base to an exterior surface of the idler wheel base, and
  - the idler wheel base and the plurality of wear inserts being a composite casting formed in a mold and in a single casting.

9. The idler wheel of claim 8, wherein the exterior surface comprises a track pad-engaging surface of the idler wheel base.

10. The idler wheel of claim 8, wherein the idler wheel base includes a tread, and
- wherein one or more of the plurality of wear inserts are located in a surface of the tread.

11. The idler wheel of claim 10, wherein an area of the plurality of wear inserts is 70% to 75% of a total area of the surface of the tread.

12. The idler wheel of claim 8, wherein the idler wheel base and the plurality of wear inserts are mechanically connected and metallurgically bonded.

13. The idler wheel of claim 8, wherein the first material includes steel and the second material includes white iron.

14. The idler wheel of claim 8, wherein the first hardness is from 45 to 55 Rockwell C (HRC) and the second hardness is from 55 to 65 HRC.

* * * * *